United States Patent [19]

Bulmer

[11] 3,997,033
[45] Dec. 14, 1976

[54] CAM OPERATED DISC BRAKE
[75] Inventor: Lloyd Bulmer, Long Beach, Calif.
[73] Assignee: Airheart Products, Inc., Chatsworth, Calif.
[22] Filed: Jan. 2, 1975
[21] Appl. No.: 537,839
[52] U.S. Cl. .............................. 188/72.7; 74/99 A; 74/107; 74/110; 192/70.23; 192/93 R
[51] Int. Cl.² ..................................... F16D 55/224
[58] Field of Search ............... 188/72.6, 72.7, 72.9, 188/106 F; 192/70.23, 93 R; 74/99 A, 107, 110, 102, 103, 104

[56] References Cited
UNITED STATES PATENTS

| | | | |
|---|---|---|---|
| 2,983,338 | 5/1961 | Vansteenkiste | 188/72.7 |
| 3,365,031 | 1/1968 | Swift | 188/72.7 X |
| 3,404,756 | 10/1968 | Swift | 188/72.6 X |
| 3,507,367 | 4/1970 | Brown et al. | 188/106 F |
| 3,547,229 | 12/1970 | Pollinger et al. | 188/72.7 X |
| 3,651,897 | 3/1972 | Hahn | 188/72.7 X |

Primary Examiner—George E. A. Halvosa
Attorney, Agent, or Firm—William W. Haefliger

[57] ABSTRACT

Mechanical brake of the pad and disc type having sure braking action, low internal friction and rapid release characteristics, and comprising a control cable responsive, movable rigid member having a directionally sloped shoulder, and follower structure having traveling tangential engagement with the member shoulder, to displace the pad into engagement with the disc for braking.

16 Claims, 12 Drawing Figures

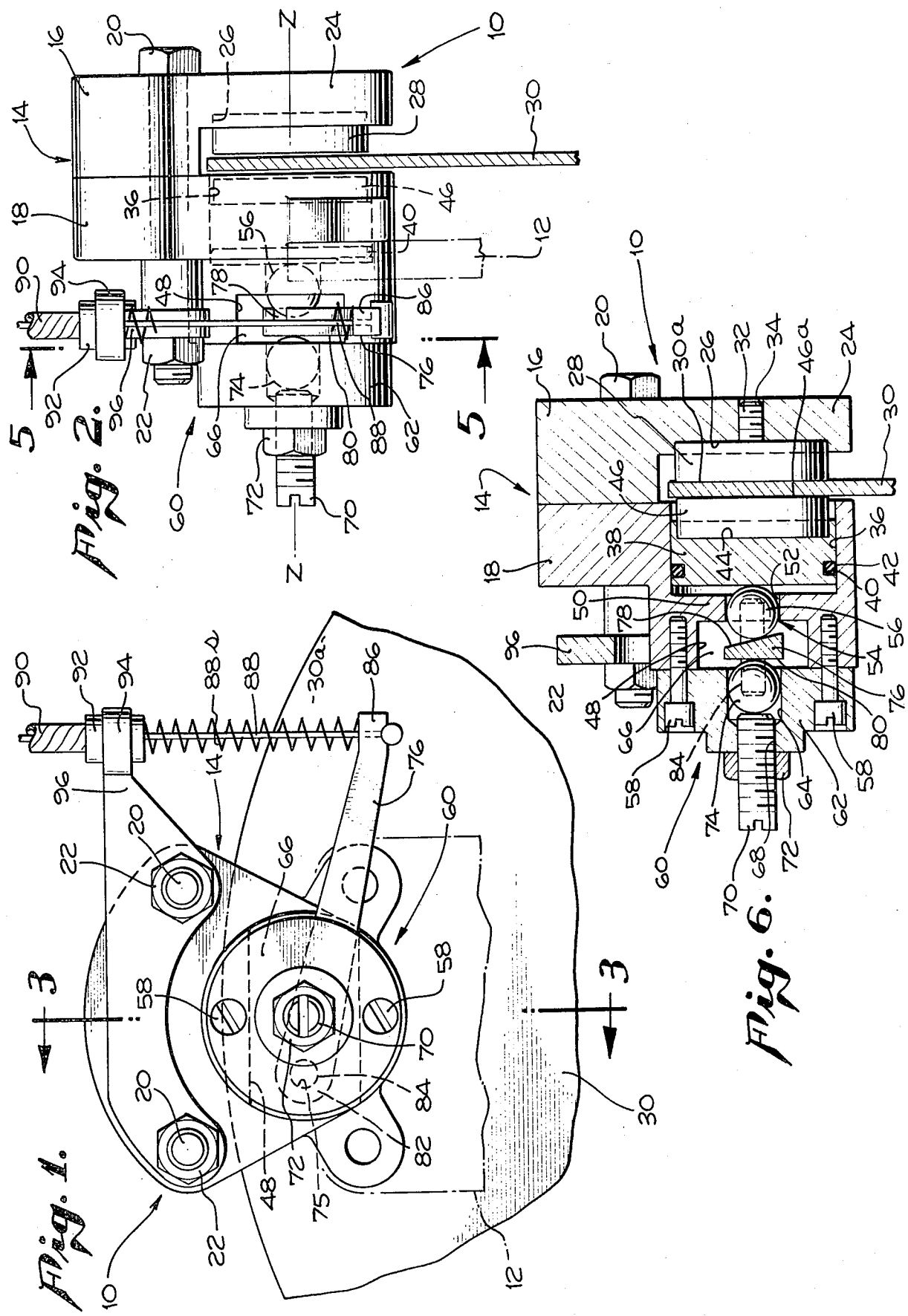

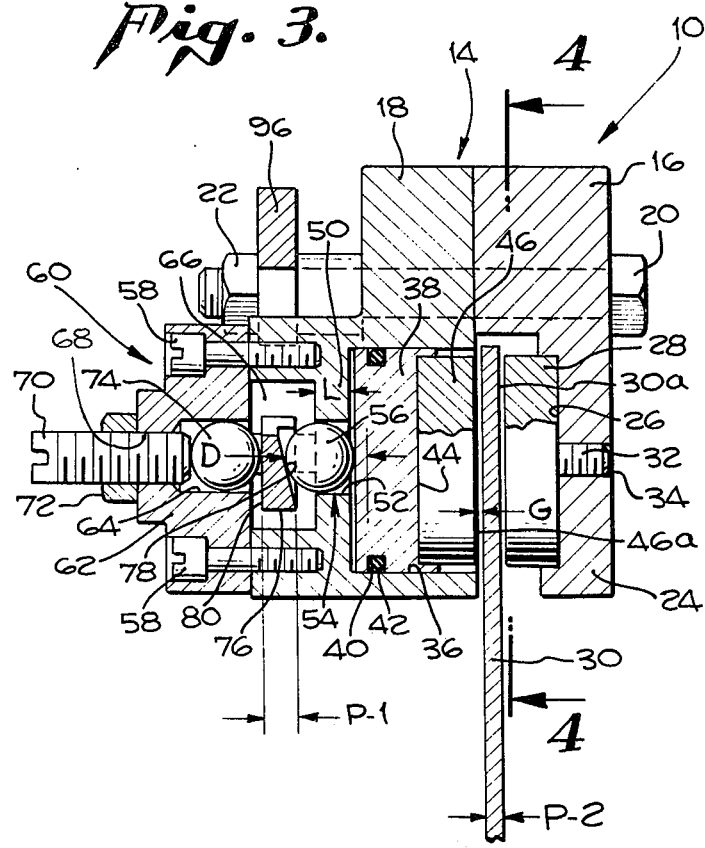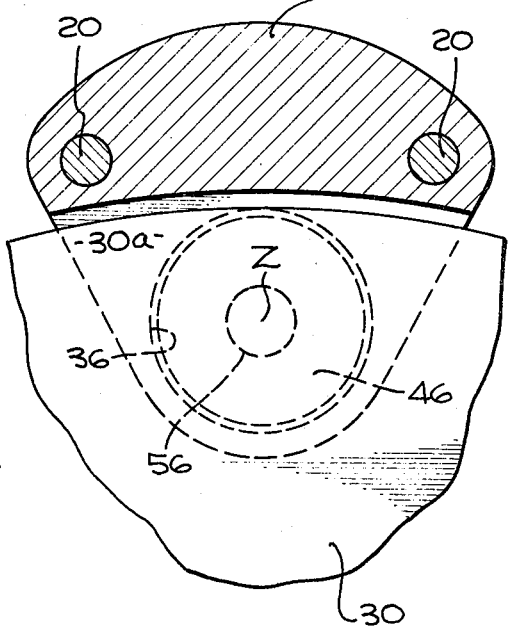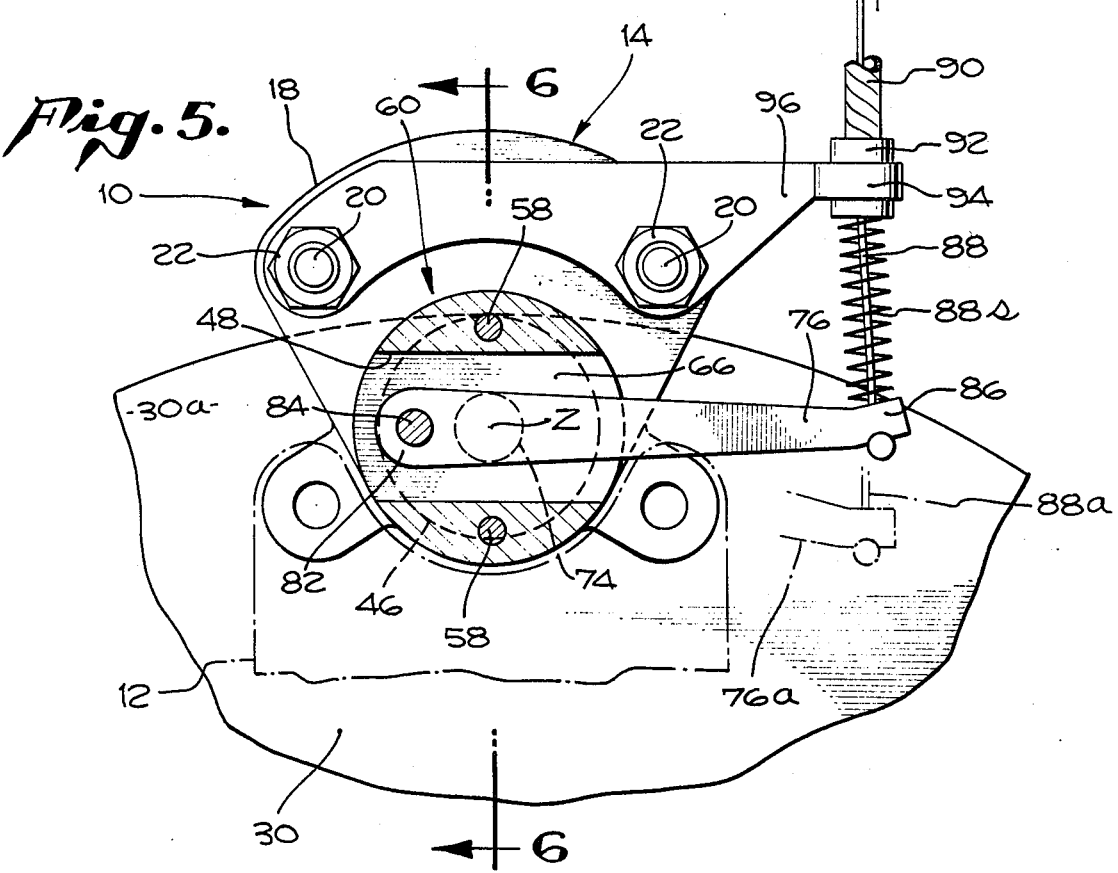

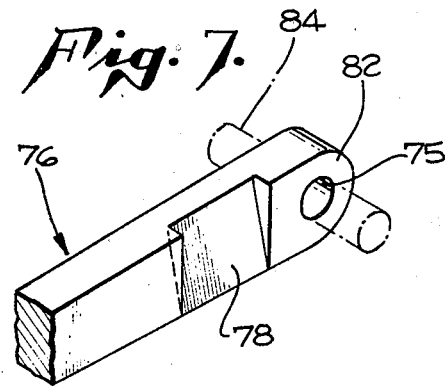
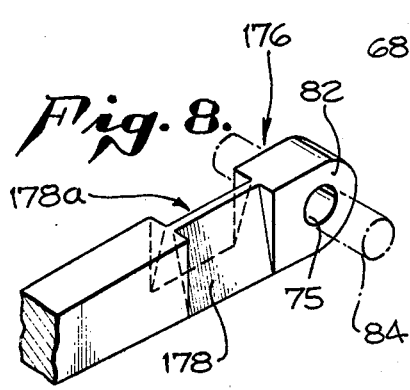
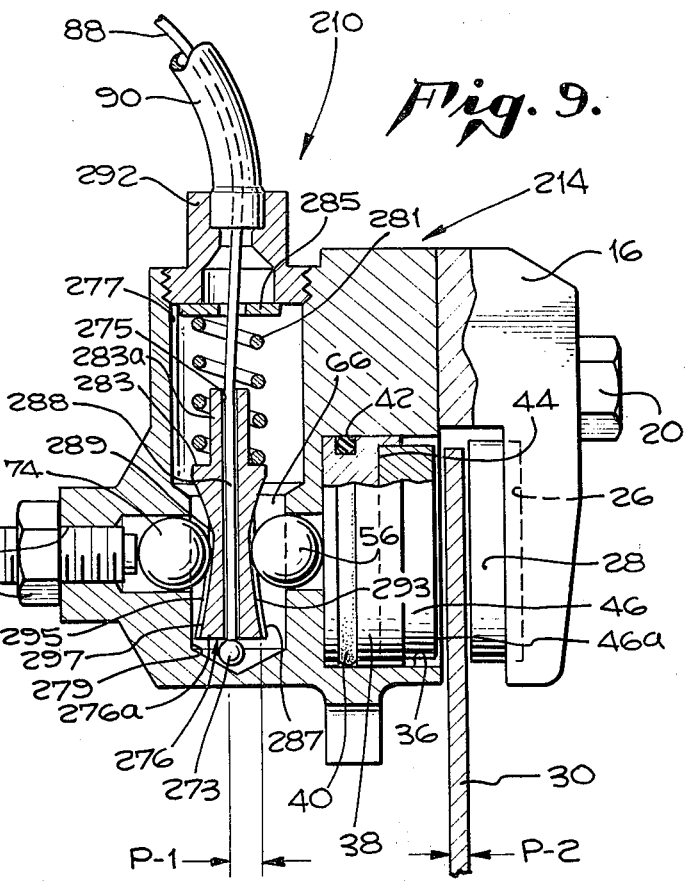
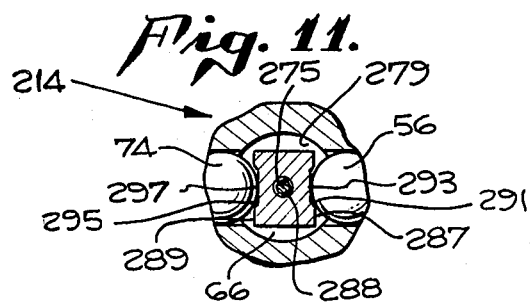
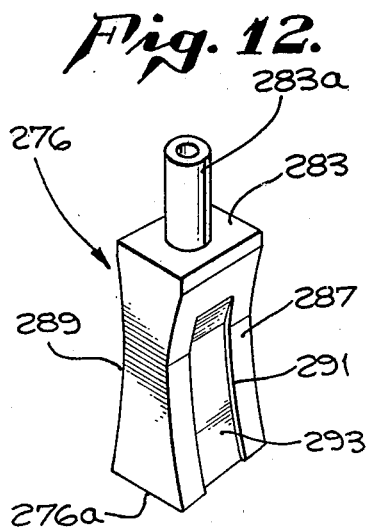
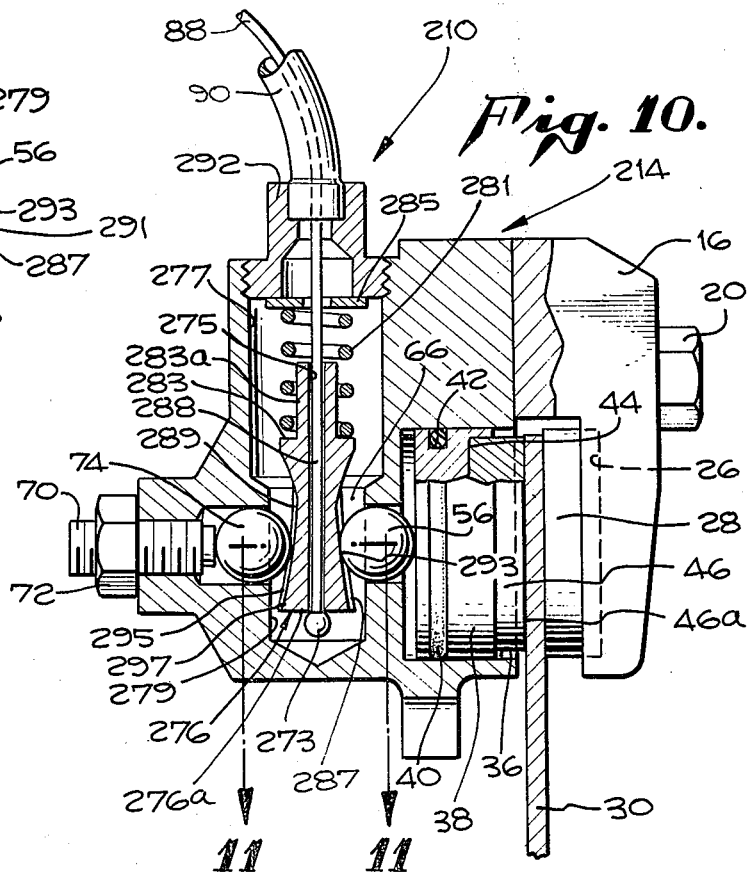

CAM OPERATED DISC BRAKE

BACKGROUND OF THE INVENTION

This invention has to do with braking devices such as may be suitable for two-wheeled motor-driven vehicles of the motorcycle type, and more particularly is concerned with improvements in the braking response, reliability, rapidity of release and efficiency of disc braking devices for such vehicles.

Doubtless there is no more critical component in a motor vehicle than the brakes. In motorcycles, brakes are an integral part of the vehicle control system being of vital importance in handling the vehicle during cornering and stopping. To an even greater degree than in automobiles there is little room for error or malfunction in motorcycle brake design. Because a motorcycle is relatively light and only two-wheeled, too much braking action at the forward wheel, or too little at the rear wheel can easily mean loss of control, skidding or cartwheeling of the motorcycle. Similarly, hanging-up of the brakes, after release by the motorcycle operator, i.e. failure to swiftly and surely release is likewise hazardous to the operator.

Disc brakes have proved to be desirable for braking control of motorcycles; their braking efficiency and the reliability inherent in the simple engagement of a laterally displaceable frictional braking pad with a wheel-hub-coupled disc has made these brakes essentially standard on motorcycles. Nonetheless the actuators or calipers for disc brakes and the controls therefor have been less reliable and less efficient then the pad and disc aspects of known disc braking systems.

PRIOR ART

As now widely used, a motorcycle braking system employs front and rear disc brakes. In each case the pad is typically urged against the disc by hydraulic fluid pressure through a hydraulic cylinder having proportional response to a hand or foot controlled lever and cable arrangement. It is in the use of hydraulics for disc brake actuation that problems arise. Foremost among these problems is lack of reliability. Hydraulic lines are subject to damage and loss of fluid, and thereby braking ability is lost as well. Particularly in rough usage environments such as off-road trails and moto-cross events, motorcycles are apt to lose braking ability through hydraulic line damage. Further the release of the pad from the disc, essential to maintaining stability in turns, is not always as rapid as a rider would like and accidents can result. Moreover, the efficiency of known systems is not at a maximum as evident from the heat produced by internal friction within the actuating mechanism or caliper structure. Because of such losses the mechanical advantage of a hydraulic systems have been thought essential heretofore despite their inherent disadvantages.

SUMMARY OF THE INVENTION

It is an object, therefore, of the present invention to provide disc brake apparatus which is sure in its braking action, low in internal friction and rapid in release. It is a further object to provide these characteristics in a mechanically actuated disc brake free of the fluid failure and slow release tendencies of hydraulically operated brakes. It is a further object to provide cable responsive mechanical disc brakes for front and/or rear wheels of motorcycles. Still another object is to provide a mechanical disc brake which applies a high level of force to the braking pad with only short travel of the control cable and differentially increased force with progressive cable travel. Moreover in furtherance of the objects of the invention the mechanical disc brake hereof is assembled readily, has few moving parts, operates reliably wet and/or dirty, and is simply adjusted.

These and other objects of the invention are realized in a disc brake apparatus having a wheel-coupled braking disc and at least one braking pad carried for disc engagement on a laterally displaceable pad support, through provision of a braking actuator means comprising a rigid member movable in a plane parallel to the disc, the member having a lateral facing shoulder opposite the pad support and sloped relative thereto in the direction of member movement, and follower structure defining a traveling locus of tangential engagement with the shoulder, the structure acting on the pad support in differential displacing relation responsive to progressive member movement in such plane.

As noted the apparatus may further include a cable control operatively coupled to the rigid member to effect the described movement thereof. The rigid member may be pivotally mounted adjacent the pad support for angular relative movement responsive to the control cable operation, or alternatively, the rigid member may be mounted adjacent the pad support for relative translational movement responsive to cable control operation.

The movable pad support typically carries the pad thereof forwardly and may include rearwardly thereof a rounded boss defining the follower structure, and laterally displaceable with the pad support. In preferred embodiments, the boss comprises a follower ball means engaged by the pad support. There may be provided rearwardly of the support an open socket, adapted to receive the follower ball means in universally rotatable relation for rolling tangential engagement with the member shoulder and the pad support.

The apparatus may further comprise stationary guide structure blocking member lateral displacement by the follower ball means. This guide structure may comprise a stationary ball means laterally, tangentially bearing on the rigid member opposite the follower ball means for member lateral displacement blocking. More particularly the stationary guide structure may comprise a universally rotatable stationary ball means coaxial with the follower ball means in rolling tangential engagement with the member opposite.

In a translationally shiftable embodiment, the rigid member may be longitudinally axially tapered to define the sloped shoulder between the stationary ball means and the follower ball means, and in longitudinally axially movable relation therewith, to laterally displace the support pad responsive to cable induced longitudinal axial movement of the member shoulder relatively between the stationary and follower ball means in coaxially opposite, tangentially engaged relation. The members axial longitudinal taper may define opposed and oppositely sloped shoulders on opposite sides of the rigid member for respective stationary and follower ball means engagement, one, or both, of which may be a planar surface or a curvilinear surface, or one surface may be planar and the other curvilinear.

In another embodiment the rigid member may be pivotally mounted; the member then being extended and with the sloped shoulder thereof formed transversely thereon. The apparatus then may include a pivot means eccentric to the pad support axis pivoting the member for angular movement of the shoulder portion relatively between the stationary ball means and the follower ball means in oppositely tangentially engaged relation to laterally displace the support pad responsive to cable induced movement of the member about the pivot means. As in the longitudinally shiftable embodiments, the pivoted rigid member may have opposed, and oppositely sloped shoulders for stationary and follower ball means engagement, the shoulders defining either planar or curvilinear surfaces or a combination of such surfaces.

In a specific form, the invention contemplates a cable-controlled disc brake apparatus comprising a wheel-coupled disc in a first plane, and a housing extending on opposite sides of the disc. Supported by the housing, there is provided:
a pair of braking pads in opposed relation across the periphery of the disc, a displaceable piston carrying one of the pads forwardly for disc engagement, the housing defining a socket rearwardly of said piston; a universally rotatable ball in the socket laterally displaceably acting on the piston; a stationary universally rotatable ball spaced opposite to and coaxial with the displaceable ball; and actuator means comprising an axially extended rigid member having control cable responsive movement relative to the housing and in a second plane parallel to the disc first plane, the rigid member having a laterally facing tapered portion engaging the laterally displaceable ball and opposite thereto the stationary ball, the member tapered portion being directionally related to member movement to urge the displaceable ball against the piston to carry the pad thereon into disc braking engagement upon member movement.

In the pivoted member embodiments thereof, the rigid member is coupled to the cable control at one end and at the opposite end pivoted eccentrically relative to the axis of piston displacement to move its tapered portion accurately between the balls.

In the translationally shiftable member embodiments, the member, which may be longitudinally grooved for self-centering ball engagement, is typically coupled to the control cable to be longitudinally axially movable between the balls thereby.

In either embodiment, the member may be directionally tapered on both sides for ball engagement and of either planar or curvilinear surface configuration as noted above.

BRIEF DESCRIPTION OF THE DRAWINGS

The invention will be further described as to an illustrative embodiment in conjunction with the attached drawings, wherein:

FIG. 1 is a view in side elevation of the disc brake apparatus of present invention;

FIG. 2 is an end elevational view thereof;

FIG. 3 is a view thereof in transverse section taken on line 3—3 in FIG. 1;

FIG. 4 is a fragmentary view thereof, somewhat enlarged and taken on line 4—4 in FIG. 3;

FIG. 5 is a view like FIG. 1 showing the brake in operation taken on line 5—5 in FIG. 2;

FIG. 6 is a view like FIG. 3 but taken on line 6—6 in FIG. 5 and showing the brake in operation;

FIG. 7 is a perspective, fragmentary view of the rigid actuator member of FIG. 1;

FIG. 8 is a view like FIG. 7 of an alternate form of rigid actuator member;

FIG. 9 is a view like FIG. 3 of an alternate form of the invention;

FIG. 10 is a view like FIG. 6 of the alternate form of the invention;

FIG. 11 is a detail view somewhat enlarged taken on line 11—11 of FIG. 10 and

FIG. 12 is a perspective view of the rigid actuator member of FIG. 9.

DESCRIPTION OF THE PREFERRED EMBODIMENTS

The present disc brake apparatus is premised on an actuator which is low in internal friction losses and thus high in braking efficiency. Heat energy expenditures are concentrated in the pad-disc engagement area for maximum braking effect with a given level of effort. As the description proceeds, the signal features of the present apparatus mentioned above: sure braking action, low internal friction and rapid release characteristics, will become apparent. In general, it may be stated that the tangential engagement of the rigid member and follower enables low friction, highly efficient transmission of the translational motion of the rigid member shoulder to the pad support laterally by the follower.

With reference now to the drawings in detail, in FIGS. 1–4 the disc brake is generally indicated at 10, mounted on a suitable support frame 12 e.g. a motorcycle frame. The brake apparatus 10 comprises a rugged two-piece housing 14 having an inboard section 16 (as mounted) and an outboard section 18 secured together front and rear by bolts 20 fastened with nuts 22. Inboard section 16 is provided with a depending flange 24 having inward circular recess 26 into which inboard braking pad 28 is fitted in close proximity to braking disc 30 to be selectively engaged therewith as will appear, secured by screw 32 in aperture 34. Braking pad 28 is thus fixed in recess 26.

Housing outboard section 18 is provided with a bore 36 coaxial with and opposite inboard section recess 26 and of somewhat greater diameter. Within the bore 36 there is provided movable pad support in the form of a close-fitting, slidable piston 38 having an O-ring perimeter seal 40 in annular groove 42. The piston top defines a circular recess 44 directly opposite and coaxial with inboard section recess 26 into which outboard braking pad 46 is fitted for carriage by the piston relatively to the braking disc 30 for selective engagement therewith.

It may be noted here that braking engagement of outboard pad 46 with disc 30 displaces the disc slightly rightward to then engage the inboard pad 28, and complete the braking arrest of the disc periphery 30a between the pads. See FIG. 6.

It is with the solely mechanical actuation of the engagement of pads 28, 46 with the disc 30 that the present invention is particularly concerned. For this purpose the present apparatus provides a simple yet rugged and jam-proof mechanism which differentially urges the outboard pad 46 into the disc upon a simple leveraging movement, with a smoothness and sureness comparable to hydraulic actuators and, for quick release, unlike most disc brakes known heretofore.

Thus, and again with reference to FIGS. 1–4 particularly, the outboard housing section 18 is further provided with a counterbore 48 coaxial to bore 36, the wall 50 between the bore and counter-bore being provided with a circular opening 52 of a reduced size relative to the bore and counterbore, defining thereby a socket 54 which is open on both sides i.e. to both bore and counterbore. As best shown in FIG. 3, within the socket 54 there is provided a follower in the form of ball 56 of closely approximate, but smaller diameter than the socket, to rest within the socket and be freely universally rotatable therein for purposes to appear. The lateral extent L of the wall 50 defines a maximum displacement range D for the follower ball 56 the difference $d$ between the diameter of ball 56 and range D being greater than the gap G between outboard pad face 46a and the opposing disc periphery 30a.

Completing the housing 14 and secured to the outboard housing section 18 by screws 58 is guide structure 60 comprising a block 62 centrally recessed at 64 coaxial with and opposite to socket 54 and spaced therefrom to provide a working space 66 between the block 62 and outboard section 18 generally circumscribed by counterbore 48. Block 62 has a tapped opening 68 in which an adjustment screw 70 is fitted, with lock-nut 72 thereon. Within the block recess 64 a second ball 74 is provided, opposite, coaxial, and equisized with the follower ball 56 and adjustable within the block recess to project more or less from the recess responsive to corresponding threaded adjustment of the screw 70 which as shown acts directly against ball 74.

Between the ball 74 in block recess 64 and the follower ball 56 in socket 54, in the working space 66, there is provided a rigid actuating member in the form of an arm 76 having a sloped shoulder portion 78 and a flat reverse surface 80 oriented to present the flat surface to the ball 74 and the sloped surface 78 to the follower ball 56 laterally; the transverse dimension of member arm 76 at shoulder 78 being sized to be in engagement with both balls simultaneously.

As best shown in FIGS. 2, 5, and 7 the arm 76 includes a portion 82 extending rearwardly from working space 66 to bore 75 journaled endwise on pivot member 84 extending between the housing outboard section 18 and block 62 and located offset or eccentric to the axis of displacement Z of the braking pad support piston 38. The arm 76 extends through and forwardly beyond the working space 66 a given distance as required for the desired mechanical advantage in pivoting about pivot member 84. The outermost arm end 86 is connected to cable wire 88 which extends slidably through spring wire housing 90 fixed in bushing 92 extending through ear 94 of mounting bracket 96 so that retractile movement of the wire 88 in wire housing 90 (upward in FIG. 1) raises arm 76 correspondingly in pivoting relation about the pivot member 84 against the resilient urging of return spring 88s. The term "cable" in the present specification and claims is used to include cables, wires, rods and other like actuator moving devices, coupled to hand or foot operated controls in the usual manner, not illustrated here, for retractile movement on braking operation; and extensile movement when the brake foot or hand control is released.

The arm 76, suitably formed of rigid material, preferably quite hard and tough like spring steel, as noted is pivoted on pivot member 84 which is offset relative to the axis Z of the displaceable pad support piston 38. In this manner the arm 76 can move angularly in a plane P-1 parallel to the plane P-2 of the disc and about pivot member 84.

With reference particularly to FIG. 3 and 7 the arm 76 is shown medially tapered to have a sloped, shoulder portion 78 which is located just between the balls 56, 74. The shoulder 78 is directionally sloped that is the taper of the medial portion or the slope of the shoulder is at least partly across the plane P-1 (FIG. 3) in which the arm 76 moves upon cable wire 88 inducement, and narrowing toward the direction of movement. With reference to FIG. 8 an alternate form of arm 176 is shown having laterally facing shoulder 178 like shoulder 78 of arm 76 and an oppositely laterally facing and sloped shoulder 178a, rather than the flat surface 80 of arm 76 to be opposite ball 74. In either embodiment the arm shoulder 78, or 178 defines an inclined plane tilted across the plane of arm movement and in a direction such that braking operation i.e. retractile movement of the cable wire 88 draws the shoulder 78 (178) through the working space 66 in a manner progressively increasing the effective width of the shoulder. This effect is multiplied further by having an oppositely facing and tapered shoulder 178a as in FIG. 8.

As best shown in FIGS. 3, 5 and 6, the balls 56, 74 are in engagement with the arm 76 at arm portion 78; therefore the widening of the arm in its angular motion in plane P-1 as the heavier portion of the shoulder 78 assumes ball engagement forces the balls 56, 74 apart. The ball 74 is stationary, fixed in place by location adjustment screw 70 and this ball thus guides the arm 76 in its plane of normal angular movement, P-1. The follower ball 56, however, is free to move laterally (within the range D, FIG. 3) in the socket 54 as the piston 38 is correspondingly displaced. Thus the thickening shoulder 78 width during angular movement of the arm 76 by cable wire 88 shifts follower ball 56 laterally and thus displaces piston 38 laterally and the outboard pad 46 carried in piston recess 44 is also displaced laterally and into engagement with the disc 30.

The balls 56, 74 are advantageously universally rotatable to permit self-correction of wear or scoring. In practice, the balls 56, 74 travel i.e. roll and/or slide against and relative to arm 76. Thus any rounded protuberance or boss or other structure, including fixed balls, affording tangential contact, i.e. point contact of a rounded object with a relatively planar opposing surface may be used, but balls have been found to be most effective. The moving tangential contact of the balls (or other rounded follower and guide members), with the arm 76 surface, thus defines a travelling locus of such engagement.

The displacement of the outboard braking pad 46 into the disc 30 increases with progressive movement of the arm 76 because the shoulder 78 becomes progressively thicker and piston 38 displacement is thus further increased. Thus displacement of the pad 46 is differential with progressive arm movement, giving an extremely effective braking response. The shoulder 78 surface may be planar as shown in FIGS. 1–6 or curvilinear as shown in FIG. 12 for a further enhanced differential action characteristic in piston displacement, in response to the same cable-induced arm movement.

In either case with reference to FIGS. 5 and 6, the cable 88 induced arm 76 movement (upward) shifts the follower ball 56, piston 38 and the pad 46 thereon to provide pad 46 to disc 30 engagement, which as noted above displaces the disc slightly into engagement contact with inboard braking pad 28. Upon release of the control, cable 88 returns to its normal length (88a in FIG. 5) and the arm to its normal disposition (76a in FIG. 5). The ball 56 immediately releases from forcing lateral pressure displacement of piston 38 and moves laterally into working space 66 as the shoulder 78 narrow portion comes opposite the ball 56. Release of follower force from piston 38 results in the pad 46 being backed off disc 30 as the piston seeks ball contact. The result of this ready disengagement is that hang-up of braking pads on discs, which may occur in slow to release hydraulic systems is avoided, providing better cornering control and more comfortable motorcycle operation.

With reference now particularly to FIGS. 9, 10, 11 and 12, in which previous parts are given like numerals, and modified parts like numerals plus 200, there is shown a form of disc brake apparatus according to the invention in which the rigid actuator member is longitudinally shiftable rather than pivoted, and in a plane parallel to the disc plane. The tapered ball-engaging shoulder is accordingly tapered toward the member axis to give wedging action against the balls upon member translational movement.

Giving attention to the specifically different features of the FIGS. 9, 10 disc brake embodiment, generally indicated at 210, the rigid arm actuator 276 is carried in working space 66 between balls 56, 74 by an extension 288 of cable 88 extending through central bore 275 in the actuator and secured there by plug 273. The cable 88 is enclosed within housing 90 secured in bushing 292 threaded into the upper end of bore 277 in brake housing 214; the actuator 276 extending through bore 277 into counterbore 279 defining therewith working space 66. A return spring 281 is provided in bore 277 centered on cable 88 and resiliently compressed between annular shoulder 283 defined by collar 283a of the actuator 276 and stop washer 285 engaged with bushing 292, to act downwardly against the actuator during retractile movement of cable 88 to apply the brake and to return the actuator to rest position by inducing extensile movement of the cable upon release of the hand or foot control force against it.

The actuator 276 is centrally longitudinally dished to define a gently curved oppositely facing and tapered surfaces 287, 289 in which there are formed shallow, plane-bottomed grooves 291, 295. As best shown in FIG. 11 the balls 56, 74 ride against the actuator 276 by tangentially engaging the bottoms 293, 297 of groove 291, 295. The grooves 291, 295 serve to guide the actuator movement in self-centering relation with the balls 56, 74. See FIG. 11.

Operation of the FIGS. 9, 10 embodiment is seen easily by comparing the position of actuator 276 when no braking is taking place as seen in FIG. 9 and the axially, longitudinally shifted position thereof shown in FIG. 10. As can be seen the longitudinal movement (upward) of the actuator 276 in plane P-1 moves the relatively thicker butt end 276a of the actuator relative to balls 56, 74 wedging these balls apart. Only ball 56 can be displaced (together with piston 38) and thus the face 46a of pad 46 is forced into engagement with the disc 30. Moreover, movement of the disc is progressive and multiply differential as the curvature of groove bottom 291 accelerates the ball 56 displacement with increased longitudinal movement of the actuator, while simultaneously ball 74 travelling in tangential relation in groove 295, on bottom 297 thereof further increases the rate of progressive, differential lateral displacement of ball 56 as well, due to the progressively increasing curvature of the groove bottom 297. Brake control release permits return spring 281 to displace the actuator 276 axially, longitudinally downward removing the lateral displacing force on the pad 46.

Thus in both the pivotal and axial shifting embodiments, the rigid members 76, 276 move parallel to the disc plane P-2 and carry through their plane of movement (P-1) a relatively sloped shoulder or surfaces, 78, 287 in the direction of their movement to urge the boss, ball 56, in tangential engagement therewtih laterally against piston 38, braking pad 46 carried thereby into disc 30 engagement for swift, sure, readily realeasable braking action.

I claim:

1. In a disc brake apparatus for a wheel-coupled braking disc, at least one braking pad carried for disc engagement on a laterally displaceable pad support, a braking actuator including means defining a first socket opposite said pad support and having a lateral through bore, means beyond said socket means comprising a rigid member bodily movable in a plane generally parallel to said disc, said member having a laterally facing shoulder opposite said pad support and sloped relative thereto in the direction of member movement, and follower structure comprising follower ball means rotatable and laterally displaceable in said socket through bore, said socket limiting lateral follower ball means displacement to such displacement along the longitudinal axis of the pad support, whereby the follower ball means surface defines a traveling locus of tangential engagement with said shoulder, said follower ball means acting on said pad support in axial displacing relation responsive to progressive member bodily movement in said plane, there being a second socket at the lateral side of said rigid member opposite said first socket, said sockets being integrally connected, and a second ball retained in said second socket against lateral and longitudinal bodily movement relative to said sockets during said member bodily movement, said second ball engaged with the opposite lateral side of said member.

2. Disc brake apparatus according to claim 1 wherein said two sockets are laterally coaxial.

3. Disc brake apparatus according to claim 2 in which said second ball tangentially bears on said member opposite lateral side in member lateral displacement blocking relation.

4. Disc brake apparatus according to claim 3 including adjusting means bearing on the side of the second ball opposite said member to adjustably displace the second ball, laterally.

5. Disc brake apparatus according to claim 4 including also a cable control operatively coupled to said rigid member.

6. Disc brake apparatus according to claim 5, in which said rigid member is longitudinally axially tapered to define said sloped shoulder in longitudinally axially movable relation to laterally displace said pad responsive to cable-induced longitudinal axial movement of said member shoulder relatively between said stationary and follower balls in oppositely tangentially engaged relation.

7. Disc brake apparatus according to claim 5 in which the rigid member is extended and has said sloped shoulder formed transversely thereof, and including also pivot means eccentric to the pad support axis pivoting said member for angular movement of said member shoulder relatively between the second ball and the follower means in oppositely tangentially engaged relation therewith to laterally displace said support pad responsive to cable-induced movement of said member about said pivot means.

8. In a disc brake apparatus having a wheel-coupled braking disc, at least one braking pad carried for disc engagement on a laterally displaceable pad support, a braking actuator including means defining a socket opposite said pad support, means beyond said socket means comprising a rigid member movable in a plane parallel to said disc, said member having a laterally facing shoulder opposite said pad support and sloped relative thereto in the direction of member movement, and follower structure comprising follower ball means rotatable and laterally displaceable in said socket, said socket limiting lateral follower ball means displacement to such displacement along the longitudinal axis of the pad support, whereby the follower ball means surface defines a traveling locus of tangential engagement with said shoulder, said follower ball means acting on said pad support in dfferential, axial displacing relation responsive to progressive member movement in said plane, said pad support carrying said pad forwardly and having a lateral surface engaged by said follower ball means, there being stationary guide structure blocking member lateral displacement by said follower ball means, said stationary guide structure comprising stationary ball means laterally, tangentially bearing on said member opposite said follower ball means in member lateral displacement blocking relation, said stationary ball means being coaxial with said follower ball mans and having rolling tangential engagement with said member, a cable control operatively coupled to said rigid member, said rigid member being longitudinally axially tapered to define said sloped shoulder in longitudinally axially movable relation to laterally displace said pad responsive to cable-induced longitudinal axial movement of said member shoulder relatively between said stationary and follower ball means in oppositely tangentially engaged relation therewith, said member axial longitudinal taper defining an opposed and oppositely sloped shoulder on said rigid member for stationary ball means engagement.

9. Disc brake apparatus according to claim 8 in which at least one of said shoulders has a planar surface.

10. Disc brake apparatus according to claim 8 in which at least one of said shoulders has a curvilinear surface.

11. A cable-controlled disc brake apparatus comprising a wheel-coupled disc in a first plane, and a housing extending on opposite sides of said disc; and, supported by the housing: a pair of braking pads in opposed relation across the periphery of said disc, a displaceable piston carrying one of said pads forwardly on the piston longitudinal axis for disc engagement, said housing defining a first socket means rearwardly of said piston and having a lateral through bore; a first universally rotatable ball in said socket laterally displaceably acting on said piston along said piston lateral axis in socket means guided relation; a second and universally rotatable ball spaced opposite to and coaxial with said displaceable ball; the housing defining a second socket having a second bore receiving the second ball; said sockets blocking the balls against longitudinal bodily movement, said two socket bores being laterally coaxial; and actuator means comprising an axially extended rigid member having control cable-responsive movement relative to said housing and in a second plane parallel to said first plane, said member having laterally facing portions engagiing said laterally displaceable ball and opposite thereto said stationary ball in tangential relation, one of said laterally facing portions being tapered longitudinally, said member tapered portion being directionally related to member movement to urge said displaceable ball against said piston to carry the pad thereon into disc braking engagement upon member movement.

12. Disc brake apparatus according to claim 11 in which said rigid member is coupled to said cable control at one end and at the opposite end pivoted eccentrically relative to the axis of piston displacement to move its tapered portion arcuately between said balls.

13. Disc brake apparatus according to claim 11 in which said rigid member is coupled to said control cable to be longitudinally axially shiftable between said balls thereby.

14. Disc brake apparatus according to claim 13 in which the rigid member tapered portion is longitudinally grooved for self-centering ball engagement.

15. A cable-controlled disc brake apparatus comprising a wheel-coupled disc in a first plane, and a housing extending on opposite sides of said disc; and supported by the housing; a pair of braking pads in opposed relation across the periphery of said disc, a displaceable piston carrying one of said pads forwardly for disc engagement, said housing defining a socket rearwardly of said piston; a universally rotatable ball in said socket laterally displaceably acting on said piston; a stationary universally rotatable ball spaced opposite to and coaxial with said displaceable ball; and actuator means comprising an axially extended rigid member having control cable responsive movement relative to said housing and in a second plane parallel to said first plane, said member having a laterally facing tapered portion engaging said laterally displaceable ball and opposite thereto said stationary ball, said member tapered portion being directionally related to member movement to urge said displaceable ball against said piston to carry the pad thereon into disc braking engagement upon member movement, said rigid member being coupled to said cable control at one end and at the opposite end pivoted eccentrically relative to the axis of piston displacement to move its tapered portion accurately between said balls, said rigid member being directionally tapered on its opposite side for engagement with said stationary ball.

16. A cable-controlled disc brake apparatus comprising a wheel-coupled disc in a first plane, and a housing extending on opposite sides of said disc; and supported by the housing: a pair of braking pads in opposed relation across the periphery of said disc, a displaceable piston carrying one of said pads forwardly for disc engagement, said housing defining a socket rearwardly of said piston; a universally rotatable ball in said socket laterally displaceably acting on said piston; a stationary universally rotatable ball spaced opposite to and coaxial with said displaceable ball; and actuator means comprising an axially extending rigid member having control cable responsive movement relative to said housing and in a second plane parallel to said first plane, said member having a laterally facing tapered portion engaging said laterally displaceable ball and opposite thereto said stationary ball, said member tapered portion being directionally related to member movement to urge said displaceable ball against said piston to carry the pad thereon into disc braking engagement upon member movement, said rigid member being coupled to said control cable to be longitudinally axially shiftable between said balls thereby, the rigid member tapered portion being longitudinally grooved for self-centering ball engagement, and said rigid member being directionally tapered on its opposite side for engagement with said staitonary ball.

* * * * *